No. 862,785. PATENTED AUG. 6, 1907.
W. E. ANDREW.
VEHICLE TIRE.
APPLICATION FILED DEC. 30, 1905.

4 SHEETS—SHEET 1.

Witnesses
Philip Ferrell
E. F. Brandenburg

Inventor
W. E. Andrew,
by R. F. Dyrenforth,
his Attorney.

No. 862,785. PATENTED AUG. 6, 1907.
W. E. ANDREW.
VEHICLE TIRE.
APPLICATION FILED DEC. 30, 1905.

4 SHEETS—SHEET 2.

Witnesses
Philip Ferrell
J. F. Brandenburg

Inventor
W. E. Andrew,
by
R. S. Dyrenforth
His Attorney.

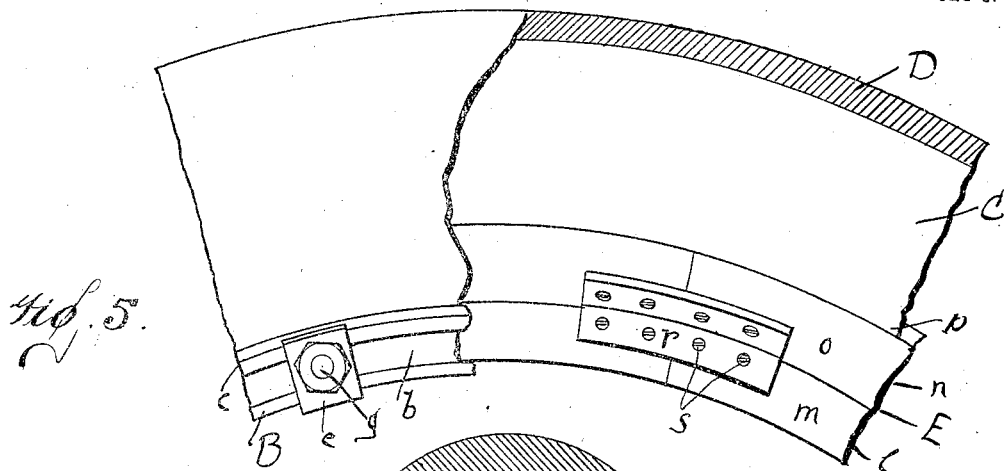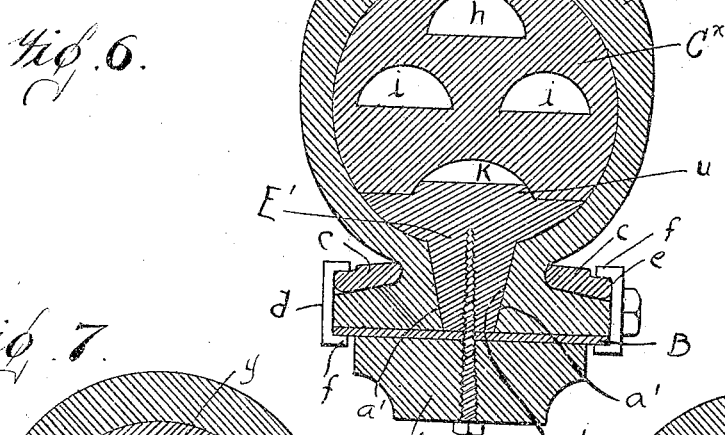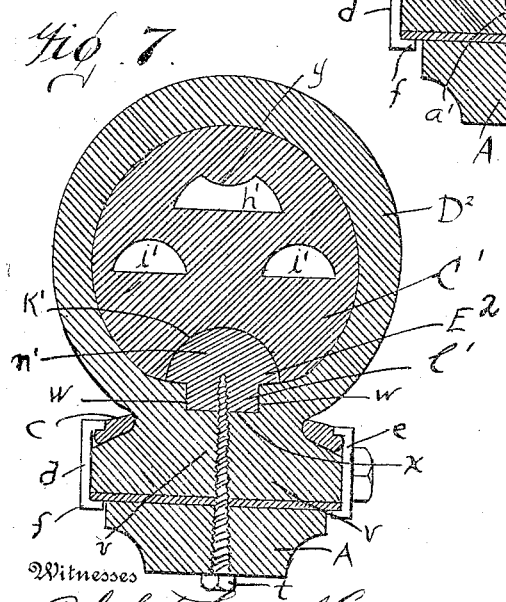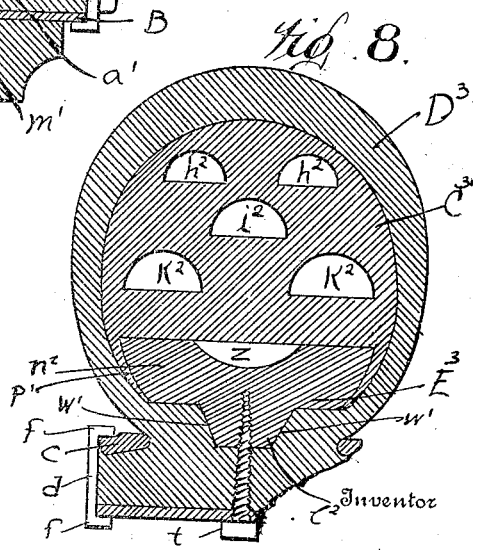

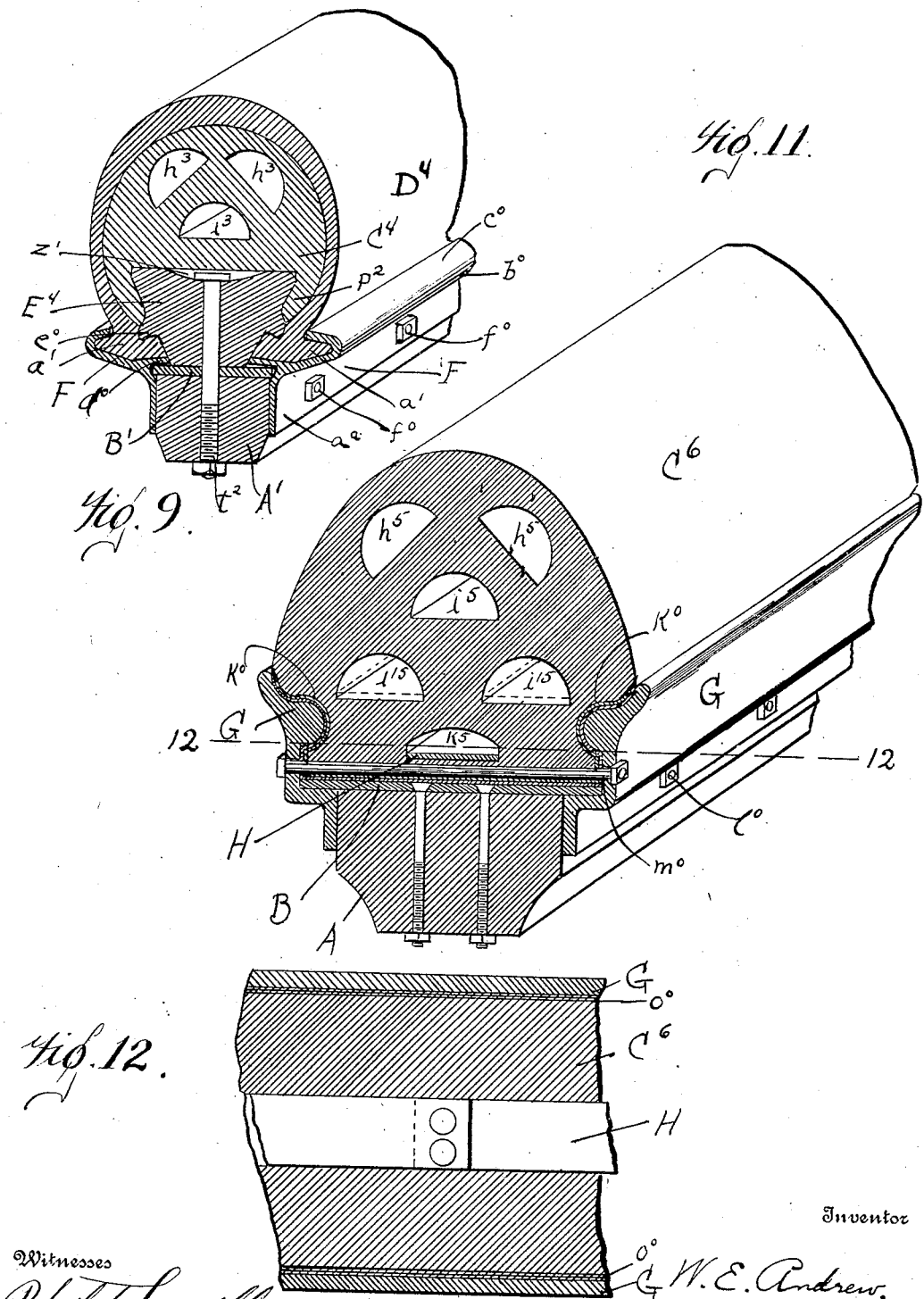

UNITED STATES PATENT OFFICE.

WILLIAM E. ANDREW, OF ATLANTIC HIGHLANDS, NEW JERSEY.

VEHICLE-TIRE.

No. 862,785.  Specification of Letters Patent.  Patented Aug. 6, 1907.

Application filed December 30, 1905. Serial No. 294,009.

*To all whom it may concern:*

Be it known that I, WILLIAM E. ANDREW, a citizen of the United States, residing at Atlantic Highlands, in the county of Monmouth and State of New Jersey, have invented certain new and useful Improvements in Vehicle-Tires; and I do hereby declare the following to be a full, clear, and exact description of the invention, such as will enable others skilled in the art to which it appertains to make and use the same.

This invention relates to cushion tires, and its object is to increase the resiliency and prolong the life of such structures and to equalize the internal strain thereof.

To these ends the invention may be regarded as residing essentially in a certain type of resilient, non-pneumatic tire body, with which may be associated one or more longitudinal cushioning chambers and one or more internal strengthening, reinforcing or clamping members.

Figure 1:
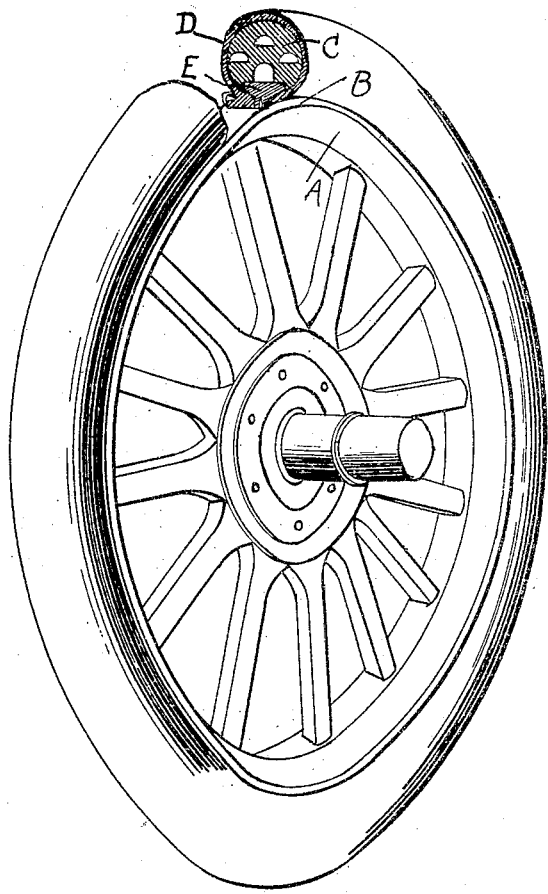
Figures 2, 10:
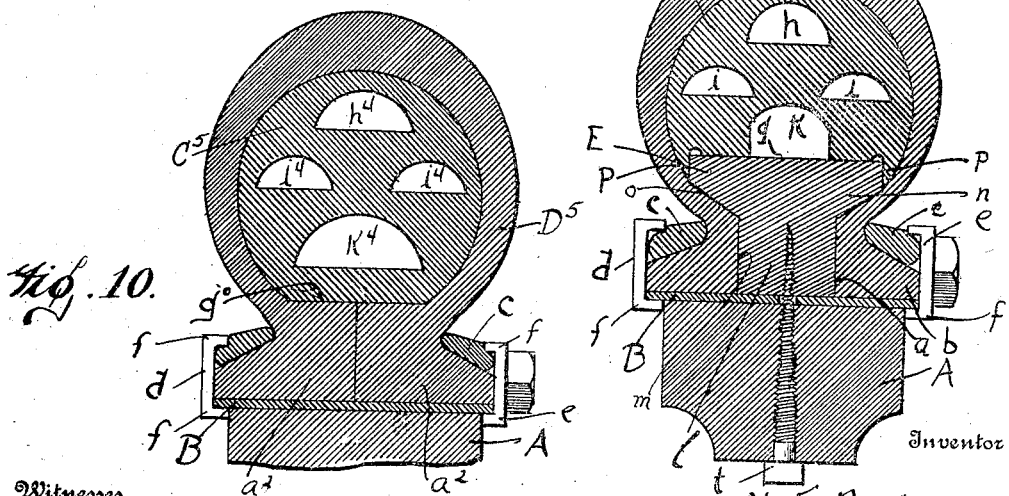
Figure 3:
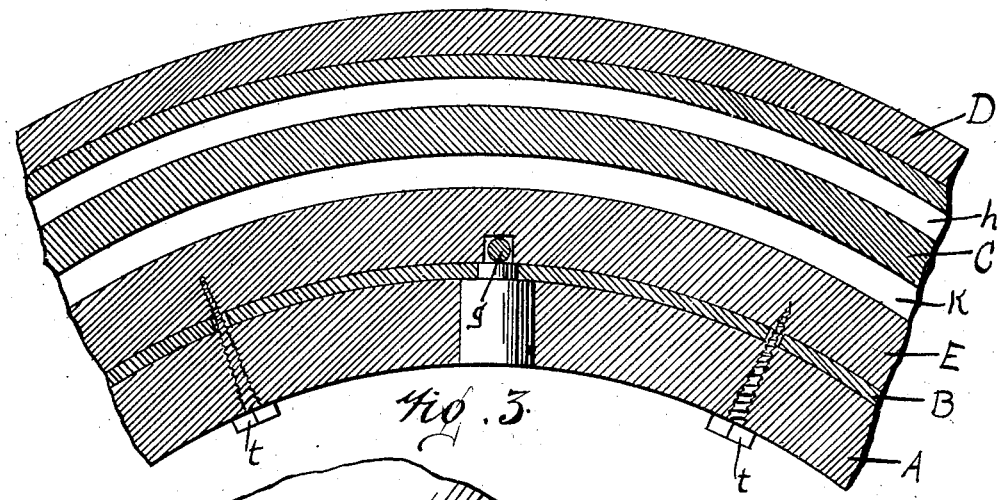
Figure 4:
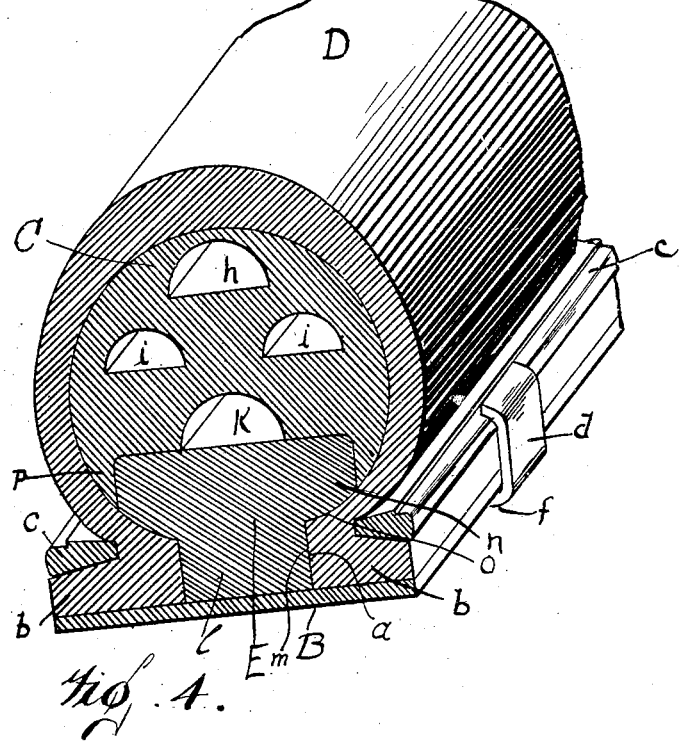

In the drawings: Figure 1 is a perspective view of an automobile or other wheel provided with a tire constructed after my invention, part of the tire being broken away to exhibit the internal structure thereof; Fig. 2 is a cross section of the tire and felly shown in Fig. 1; Fig. 3 is a longitudinal section taken through a length of the same; Fig. 4 is a perspective sectional view of the same parts; Fig. 5 is a side elevation of a portion of the tire and felly, showing certain of the parts broken away; Fig. 6 is a cross section of another form of tire constructed after my invention; Fig. 7 is a similar view of still another form; Fig. 8 is a similar view of another modification; Fig. 9 is a perspective sectional view of another form of tire embodying the principles of my invention; Fig. 10 is a cross section of still another form; Fig. 11 is a perspective sectional view of yet another form; and Fig. 12 is a horizontal section on the line 12—12, Fig. 11.

As already stated, the object of the invention is to provide a tire of the proper resilient and yielding properties which will yet have great lasting qualities.

To this end, the several forms of my invention, about to be described, are distinguished by a peculiar non-pneumatic tire body of resilient material having formed in the material thereof a plurality of longitudinal symmetrically arranged and staggered cushioning chambers of relatively large cross-section, these chambers being sufficiently spaced to leave stout supporting regions of the resilient material between them. In this way, a high degree of resiliency is secured, the tire does not wear unevenly, and does not flatten out unduly under the weight of the vehicle. Preferably, these chambers have flat bases and symmetrically arched tops, and the width is greater than the depth.

Referring to the drawings, and for the present to Figs. 1—5 thereof, A indicates the felly of the wheel constructed of wood or other material as desired.

B is a metallic tire encircling the felly and secured thereto in any suitable manner.

D is a resilient shoe or tread formed of rubber reinforced with canvas, or prepared in any suitable manner, and comprising a hollow shell having at its bottom spaced inner walls $a$ and outwardly projecting flanges $b$. These flanges afford means whereby the tread is secured to the metallic tire B; and, for this purpose, annular clamp or clencher plates $c$ encircle the tops of flanges $b$ and are engaged by nut heads $d$ on the one side of the tire and washers $e$ at the other side thereof. These nut heads and washers are provided at top and bottom with inwardly extending flanges $f$ which clasp the tops of the plates $c$ and the bottom of the metallic tire B. The shank $g$ of the bolt extends transversely through the base of the shoe D; and bolt and nut, as will be readily understood, afford means for both compressing the bottom of the shoe together and for securing the shoe to the metallic tire.

Filling the upper and major portion of the large chamber formed in the interior of the shoe D is my resilient tire body C, which is to be constructed of rubber. Extending longitudinally near the outer surface of the body is an arched chamber $h$; and beneath and on either side of this chamber are slightly smaller chambers $i$, also arched and extending longitudinally. Chambers $h$ and $i$ are completely inclosed by the material of the tire body; and at the bottom thereof is provided another arched chamber or channel $k$ open at the bottom and directly beneath chamber $h$. By this staggered arrangement of cushioning chambers, the internal strain is equally distributed through the tire body, and life and resiliency are imparted to the tire without the necessity of resorting to the employment of inner inflatable tubes and the like.

The tire body C rests at its base upon the top of an inner reinforcing, clamping and spreading member E, this latter to be made of wood, metal or other material as desired. The lower portion $l$ of this member is provided with straight side walls $m$ which bear against and form a firm support laterally for walls $a$ of shoe D when the latter are forced toward each other by bolts $g$. The upper portion $n$ flares outwardly at the sides, as at $o$, in order to afford means for clamping down upon and spreading apart the side walls of the shoe D. The flaring portion of the reinforce member also serves to spread the lower part of the tire body C to afford a firm support for the side walls of the shoe; and, with this end in view, said tire body is provided at either side with depending flanges or wings $p$ which are interposed between the flaring sides $o$ of the reinforcing member E and the side walls of the shoe D. In this form of my invention, the top $q$ of reinforcing member E is shown as a straight line in cross section, this construction affording a firm bearing surface for the base of the body C, and at the same time leaving bottom chamber $k$ open to perform its cushioning function to the utmost possible extent.

In assembling the tire of the form just described, the tire body C is first fitted to the interior of the shoe D. The body is then removed through the split base of the shoe, and its ends vulcanized or cemented together, after which it is replaced in the shoe. The reinforcing member E is next fitted in one or more sections to the circumference of the metallic tire B, and the adjoining ends of the member are secured together as shown in Fig. 5 by means of tie plates $r$, which are angled in cross section so as to fit the sides of the reinforce member and are secured to the member by screws $s$, or in other suitable manner.

A function of great value performed by reinforce member E is to guard against breaking or bursting of the tire above the clencher plates $c$. In tires, particularly of the pneumatic type, which secure the tread to the wheel felly by means of clencher plates, or similar devices, applied at the bottoms of the sides, there is always undue wear at the region immediately above such clencher members, owing to the spreading of the tire downward upon their unyielding surfaces under the weight of the load. This danger I find is quite obviated by inserting the reinforce member within the hollow shoe and at the base of the tire body. This reinforce member, rigidly secured to the wheel structure by means of screws or other fastening devices $t$ passing up through the wheel felly, metallic tire B, and into the reinforcing member, also serves admirably to prevent side slipping of the tire. It is to be noted that the flaring top portion of the reinforce member E extends well above and overhangs the clencher plates $c$, so that the force of compression due to shocks is removed from these plates and applied to the bearing surface at the top of the reinforce member.

In Fig. 6 is illustrated a slightly modified form of the tire construction described in connection with Figs. 1—5. In this form of tire construction, the reinforce member E' is provided centrally of its upper surface with a truncated arched rib or projection $u$, which fits the lower portion of arched chamber $k$. This construction assists in preventing sidewise movement of the tire-body C$^\times$, as will be readily understood. In this form of my invention, too, the inner side walls $a'$ of the shoe D' are inclined inward and downward, and the sides $m'$ of the lower portion of the reinforce member are correspondingly inclined, whereby, when the reinforce member is drawn down into position on metallic tire B, a wedging action is exerted upon the base of shoe D' to properly spread the latter.

Fig. 7 illustrates a form of my invention resembling closely the constructions illustrated in the preceding views, but differing in certain important respects. The edges of the shoe D$^2$ are here shown as extending inward at $v$ to form abutting or nearly abutting internal flanges. These flanges $v$ have formed in the upper surfaces adjoining, angled incuts $w$, which form together a peripheral channel $x$ for the reception of the lower rectangular portion $l'$ of reinforce-member E$^2$. The upper portion $n'$ of this reinforce-member is semi-circular or substantially semi-circular in cross section and occupies a chamber or channel $k'$ formed in the base of tire-body C'. This tire-body is somewhat deeper than the tire-body C occupying most of the interior of the shoe D$^2$, and is provided like tire-body C with three longitudinal chambers $h'$, $i'$. The upper chamber $h'$ is provided at the top of its arch with a reëntrant depression $y$, constituting a strengthening irb lying beneath the tread portion of the tire. Reinforce member E$^2$ is secured in place by screws or similar fastening devices, $t$, passing, as before, through the felly A, metallic tire B, and into the reinforce-member. In the construction of this form of my invention, the reinforce-member possesses, besides the functions ascribed to it, in connection with the views already described, the important duty of clamping upon the tops of flanges $v$, to secure the latter positively to the wheel.

In Fig. 8, the shoe D$^3$ is constructed substantially in the manner of shoe D$^2$, except that the side walls of incuts $w'$ converge slightly downward to conform to the shape of the lower portion $l^2$ of reinforce-member E$^3$, which tapers downward so as to have something of a wedging action in spreading the shoe. The upper portion $n^2$ of reinforce-member E$^3$ flares outward, in order to bear against the side walls of the shoe and to spread depending flanges $p'$ on the base of tire-body C$^3$ against these side walls of the shoe. The upper surface of portion $n^2$ of the reinforce member is formed with a longitudinal curved channel $z$, while the base of the tire body is substantially flat, so that the lowermost longitudinal chamber in the tire is, in this instance, formed in the reinforce-member instead of in the tire-body. Fig. 8 also discloses a different arrangement of the inclosed chambers within the tire-body. Formed in the upper portion of this body is a transverse pair of chambers $h^2$; beneath and intermediate of these is a single chamber $i^2$; while below this last chamber and in vertical alinement with chambers $h^2$ is another pair of chambers $k^2$.

By referring to Fig. 9, it will be seen how my invention may be modified for application to a different type of wheel-construction. In this view, A' is the felly, B' is a metallic tire encircling the circumference of the felly, and F are combined seat and clamp plates for the shoe D$^4$. Plates F comprise vertical portions $a^0$ disposed on either side of the felly and outward-flaring regions $b^0$ curved inward at their outer edges, as at $c^0$ and having formed at their bases inward-projecting, substantially horizontal wings $d^0$. These wings correspond in function to the clencher plates $c$ of the preceding views, constituting retaining or securing plates for holding the base of the shoe against the solid basal portions of the tire. Resting upon metallic tire B' is the base of wedge-shaped reinforce-member E$^4$, whose top is furnished with a longitudinal curved channel $z'$, and from whose flaring sides wings $e^0$ extend obliquely downward for a purpose presently to be described. In this construction, tire-body C$^4$ is flat across the base, has depending flanges $p^2$ clamped between the wedge-shaped reinforce-member and the side walls of shoe D$^4$, and is further provided with three inclosed, longitudinal arched chambers. Two of these $h^3$ are formed obliquely below the upper surface of the tire-body, and the third $i^3$ is located below and between the other two. The lower edges $a'$ of the shoe are enlarged so as to be clamped by the inward-curved portions $c^0$ of seat and clamping plates F, while at the bottom they rest upon the inward-projecting wings $d^o$. Edges $a'$ are also channeled out on their inner surfaces to receive wings $e^o$ extending downward from reinforce-member $E^4$. The base of the shoe is thus securely clamped by the plates F and the reinforce member $E^4$, while the latter also serves to spread the shoe and tire body to the requisite extent. In assembling this form of tire upon its wheel, the reinforce member is secured by means of fastening devices $t^2$, passing radially through the felly and metallic tire; and the plates F are rigidly attached to the felly by bolts $f^o$, which pass through the vertical portions $a^o$ of these plates and through the felly.

In Fig. 10 is illustrated a construction following the general form of the constructions already discussed, but omitting the reinforce member. In this instance, the lower edges $a^2$ of shoe $D^5$ are solid and extended inward to meet, so as to form a continuous bottom wall, upon which rests tire body $C^5$. The latter occupies the entire interior of the shoe and is substantially circular in cross section, with the exception of the flattened base $g^o$, which rests upon portions $a^2$ of the shoe. The tire body is provided with four inclosed annular cushioning chambers, an upper central chamber $h^4$, two intermediate chambers $i^4$, and large central base chamber $k^4$. Here, again, it will be observed that the staggered arrangement of cushioning chambers is followed.

In the forms of my invention thus far discussed, the resilient chambered tire body has constituted the inner member of a compound resilient tire structure. In Figs. 11 and 12 is shown a construction in which the tire body $C^6$ serves itself as the tread portion of the tire. Here the felly A and metallic tire B are illustrated as being of the same form as in Figs. 1–5. The tire body in this instance is shown as having six longitudinal arched chambers, a pair of obliquely disposed chambers $h^5$ near the outer surface of the tire body, a single centrally disposed chamber $i^5$ below these, a second pair $i^{15}$ located still lower and with their bases substantially horizontal, and the sixth $k^5$ located centrally near the base of the body. This distribution of chambers will be found of great value in distributing the strain in the interior of the tire and in increasing the springiness of the whole construction. On its outer sides near the base, the tire body is provided with longitudinal channels $k^o$, which receive the upper enlarged edges of the clamping plates G, these latter being secured to the felly by means of bolts $l^o$ penetrating transversely through the felly and by other transverse bolts $m^o$ passing through the base of the tire body.

I have shown this form of tire as being furnished with additional internal strengthening means in the shape of an annular band H, the ends of which, at the time when the tire is assembled, are drawn forcibly together and riveted, or otherwise secured, as illustrated in Fig. 12, in order to make it bear with some force against the bottom of chamber $k^5$, where it is preferably located. However, as indicated in dotted lines in Fig. 11, clamping bands may be positioned in other of the chambers in similar manner. It will be understood that the ends of the band are secured together before the ends of the tire body are united.

The bottom and sides of tire body $C^6$ are preferably protected by layers of canvas $o^o$.

What is claimed as new is:

1. In a cushion tire, a non-pneumatic, resilient body having a plurality of symmetrically arranged longitudinal cushioning chambers provided with flat bases and symmetrically arched tops.

2. In a cushion tire, a non-pneumatic body of resilient material having a plurality of longitudinal symmetrically arranged and staggered cushioning chambers of relatively large cross-section and of greater width than depth, said chambers being sufficiently spaced to leave stout supporting regions of the resilient material between them.

3. In a cushion-tire, the combination of an annular base member, a shoe split longitudinally of its base and having outward-projecting basal flanges, securing plates overlying said flanges and retaining the shoe against the base member, a non-pneumatic chambered body of resilient material filling the outer and major portion of the shoe, an internal annular reinforce member of unyielding material extending above said securing plates and bearing downward upon the base of the shoe, and means for forcing said reinforce member downward.

4. In a cushion-tire, the combination of an annular base member, a shoe split longitudinally of its base and having outward-projecting basal flanges, securing plates overlying said flanges and retaining the shoe against the base member, a non-pneumatic chambered body of resilient material filling the outer and major portion of the shoe, an internal annular reinforce member of unyielding material extending above said securing plates and bearing downward upon the base of the shoe, and means for securing said reinforce member to the annular base member, whereby said reinforce member serves to spread the shoe and to prevent sidewise slipping of the tire.

In testimony whereof, I affix my signature, in the presence of two subscribing witnesses.

WILLIAM E. ANDREW.

Witnesses:
W. NESBIT SUDEKER,
WM. M. ROBERTS.